(12) United States Patent
Takahira et al.

(10) Patent No.: US 8,999,503 B2
(45) Date of Patent: Apr. 7, 2015

(54) THERMALLY REMOVABLE PRESSURE-SENSITIVE ADHESIVE SHEET

(75) Inventors: Hitoshi Takahira, Osaka (JP); Satomi Yoshie, Osaka (JP)

(73) Assignee: Nitto Denko Corporation, Osaka (JP)

( * ) Notice: Subject to any disclaimer, the term of this patent is extended or adjusted under 35 U.S.C. 154(b) by 5 days.

(21) Appl. No.: 13/502,289

(22) PCT Filed: Oct. 20, 2010

(86) PCT No.: PCT/JP2010/068457
§ 371 (c)(1),
(2), (4) Date: Apr. 16, 2012

(87) PCT Pub. No.: WO2011/049116
PCT Pub. Date: Apr. 28, 2011

(65) Prior Publication Data
US 2012/0208015 A1    Aug. 16, 2012

(30) Foreign Application Priority Data
Oct. 20, 2009  (JP) ................................. 2009-241721

(51) Int. Cl.
| | | |
|---|---|---|
| C08G 63/08 | (2006.01) | |
| C08G 63/16 | (2006.01) | |
| C09J 167/04 | (2006.01) | |
| C09J 175/06 | (2006.01) | |
| C09J 5/06 | (2006.01) | |
| C09J 5/08 | (2006.01) | |
| C09J 167/00 | (2006.01) | |
| B32B 7/06 | (2006.01) | |
| B32B 7/12 | (2006.01) | |
| B32B 27/36 | (2006.01) | |
| C08G 63/60 | (2006.01) | |
| C09J 7/02 | (2006.01) | |
| C08G 18/79 | (2006.01) | |
| C08G 18/42 | (2006.01) | |

(52) U.S. Cl.
CPC ................ *C09J 167/00* (2013.01); *B32B 7/06* (2013.01); *B32B 7/12* (2013.01); *B32B 27/36* (2013.01); *C08G 63/60* (2013.01); *C09J 5/06* (2013.01); *C09J 7/0246* (2013.01); *C09J 2205/11* (2013.01); *C09J 2205/302* (2013.01); *C09J 2467/00* (2013.01); *C08G 18/791* (2013.01); *C08G 18/4202* (2013.01); *C08G 18/428* (2013.01); *C09J 175/06* (2013.01); *C08G 2170/40* (2013.01); *C08G 2170/60* (2013.01)

(58) Field of Classification Search
None
See application file for complete search history.

(56) References Cited

U.S. PATENT DOCUMENTS

| | | | |
|---|---|---|---|
| 5,496,641 A * | 3/1996 | Mase et al. | 428/423.1 |
| 6,001,891 A | 12/1999 | Higuchi et al. | |
| 6,432,475 B1 * | 8/2002 | Yamamoto et al. | 427/208.4 |
| 6,630,239 B2 * | 10/2003 | Cernohous et al. | 428/355 R |
| 6,803,443 B1 * | 10/2004 | Ariga et al. | 528/354 |
| 7,005,002 B2 * | 2/2006 | Glockner et al. | 106/31.13 |
| 7,070,051 B2 * | 7/2006 | Kanner et al. | 206/382 |
| 2003/0216519 A1 * | 11/2003 | Heilmann et al. | 525/191 |
| 2005/0136251 A1 | 6/2005 | Kishimoto et al. | |
| 2008/0008831 A1 | 1/2008 | Kishimoto et al. | |
| 2008/0169062 A1 * | 7/2008 | Kishimoto et al. | 156/280 |
| 2010/0224316 A1 * | 9/2010 | Soejima et al. | 156/250 |
| 2010/0233467 A1 * | 9/2010 | Niwa et al. | 428/323 |
| 2011/0111220 A1 * | 5/2011 | Takarada et al. | 428/345 |
| 2011/0135924 A1 | 6/2011 | Takahira et al. | |
| 2011/0244221 A1 | 10/2011 | Hayashi et al. | |
| 2011/0244227 A1 | 10/2011 | Hayashi et al. | |
| 2011/0287240 A1 | 11/2011 | Ikishima et al. | |
| 2011/0287253 A1 | 11/2011 | Hayashi et al. | |
| 2012/0064339 A1 | 3/2012 | Yamagata et al. | |

FOREIGN PATENT DOCUMENTS

| | | |
|---|---|---|
| CN | 1451707 | 10/2003 |
| EP | 1 354 925 | 10/2003 |
| GB | 1308531 | 2/1973 |
| GB | 1 153 055 | 11/2001 |
| GB | 1 985 679 | 10/2008 |
| JP | 51-24534 | 7/1976 |
| JP | 56-61468 | 5/1981 |
| JP | 56-61469 | 5/1981 |
| JP | 60-252681 | 12/1985 |
| JP | 08003297 A * | 1/1996 |
| JP | 11-60716 | 3/1999 |
| JP | 2000-160125 | 6/2000 |
| JP | 2000-344877 | 12/2000 |

(Continued)

OTHER PUBLICATIONS

Human translation of JP 08003297A (1996).*
Human translation of JP 2004231797 A (2004).*
U.S. Appl. No. 13/508,641 to Hitoshi Takahira et al., filed May 8, 2012.
U.S. Appl. No. 13/502,146 to Hitoshi Takahira et al., filed Apr. 16, 2012.

(Continued)

*Primary Examiner* — Frank D Ducheneaux
(74) *Attorney, Agent, or Firm* — Greenblum & Bernstein, P.L.C.

(57) ABSTRACT

A thermally removable pressure-sensitive adhesive sheet includes a substrate and a pressure-sensitive adhesive layer that is provided on at least one side of the substrate and made from a polyester-based pressure-sensitive adhesive composition containing a polyester including at least a lactic acid unit, a dibasic acid unit, and a glycol unit, a foaming agent, and a crosslinking agent. The dibasic acid unit includes a dimer acid, the polyester has a weight average molecular weight of 20,000 to 200,000 and a glass transition temperature of −70 to −20° C. as measured using a differential scanning calorimeter at a temperature rise rate of 20° C./minute, and the polyester has a hydroxyl value of 1 to 60 mgKOH/g.

9 Claims, No Drawings

(56) References Cited

FOREIGN PATENT DOCUMENTS

| | | |
|---|---|---|
| JP | 2002-088145 | 3/2002 |
| JP | 2004-143268 | 5/2004 |
| JP | 2004-231797 | 8/2004 |
| JP | 2005-179496 | 7/2005 |
| JP | 2008-13593 | 1/2008 |
| JP | 2008-195819 | 8/2008 |
| JP | 2009-040849 | 2/2009 |
| WO | 00/35982 | 6/2000 |
| WO | 2010/016514 | 2/2010 |

OTHER PUBLICATIONS

U.S. Appl. No. 13/502,153 to Hitoshi Takahira et al., filed Apr. 16, 2012.
U.S. Appl. No. 13/502,178 to Satomi Yoshie et al., filed Apr. 16, 2012.
U.S. Appl. No. 13/502,238 to Satomi Yoshie et al., filed Apr. 16, 2012.
U.S. Appl. No. 13/493,099 to Shou Uchida et al., filed Jun. 11, 2012.
U.S. Appl. No. 13/493,222 to Akifumi Kido et al., filed Jun. 11, 2012.
U.S. Appl. No. 13/493,252 to Akifumi Kido et al., filed Jun. 11, 2012.
U.S. Appl. No. 13/362,097 to Kenichi Kataoka et al., filed Jan. 31, 2012.
Search report from International Application No. PCT/JP2010/068457, mail date is Dec. 7, 2010.
International Preliminary Report on Patentability for PCT/JP2010/068457, mail date is May 24, 2012.
Office Action issued with respect to patent family member Chinese Patent Application No. 201080042517.7, mailed Jan. 31, 2013, with English-language translation thereof.
Li et al., "Additives for Adhesives", Chemical Industry Press, p. 64, 167 (Feb. 2005), and partial English-language translation thereof.
Jin et al., "Information Recording Material", Chemical Industry Press, p. 442 (May 2003) (English version).
Extended European Search Report for EP Patent Application No. 10824965.7, mailed Jan. 28, 2015.

\* cited by examiner

THERMALLY REMOVABLE PRESSURE-SENSITIVE ADHESIVE SHEET

TECHNICAL FIELD

The invention relates to a thermally removable pressure-sensitive adhesive sheet.

BACKGROUND ART

Conventionally known thermally removable pressure-sensitive adhesive sheets are composed of a backing and a pressure-sensitive adhesive layer that is provided on the backing and contains an expanding or foaming agent such as thermally expandable microspheres (see Patent Documents 1 to 5).

Thermally removable pressure-sensitive adhesive sheets combine tackiness with peelability after use. Specifically, they are so designed that after they achieve the object of adhering to an adherend, their pressure-sensitive adhesive layer, which contains an expanding or foaming agent such as thermally expandable microspheres, expands or foams when heated, so that the surface of the pressure-sensitive adhesive layer is deformed to have asperities, which reduces the area of adhesion to the adherend and thus reduces the adhesive strength, so that the adherend can be easily separated. Therefore, they are used for a variety of purposes, such as fixation (e.g., temporary fixation) of electronic components or materials therefor during processing thereof and fixation (e.g., temporary fixation) of products during distribution such as transportation or conveyance.

Thermally removable pressure-sensitive adhesive sheets are not used in final products and generally incinerated after they are used during processing, transportation and so on. Therefore, since there has been a concern about the depletion of fossil resources or the increase in carbon dioxide due to combustion of fossil resources, which is a cause of global warming, they are required to be produced using plant-derived alternative materials, which are so-called carbon neutral, so that measures can be taken against that.

In addition, synthetic rubbers and acryl-based pressure-sensitive adhesives have been used as adhesive materials for the thermally removable pressure-sensitive adhesive sheets (for example, Patent Document 6), and at present, no available plant-derived acryl-based pressure-sensitive adhesive has been found.

PRIOR ART DOCUMENTS

Patent Documents

Patent Document 1: JP-B No. 51-24534
Patent Document 2: Japanese Patent Application Laid-Open (JP-A) No. 56-61468
Patent Document 3: JP-A No. 56-61469
Patent Document 4: JP-A No. 60-252681
Patent Document 5: JP-A No. 2005-179496

SUMMARY OF THE INVENTION

Problems to be Solved by the Invention

Thus, an object of the invention is to provide a thermally removable pressure-sensitive adhesive sheet that is produced using a plant-derived raw material, is global environmentally-friendly, has stable adherability before foaming by heating, and has good peelability after foaming by heating.

Means for Solving the Problems

As a result of earnest studies to solve the problems, the inventors have found the thermally removable pressure-sensitive adhesive sheet described below and completed the invention.

Specifically, the invention is directed to a thermally removable pressure-sensitive adhesive sheet including a substrate and a pressure-sensitive adhesive layer that is provided on at least one side of the substrate and made from a polyester-based pressure-sensitive adhesive composition containing a polyester including at least a lactic acid unit, a dibasic acid unit, and a glycol unit, a foaming agent, and a crosslinking agent, wherein the dibasic acid unit includes a dimer acid, the polyester has a weight average molecular weight of 20,000 to 200,000 and a glass transition temperature of −70 to −20° C. as measured using a differential scanning calorimeter at a temperature rise rate of 20° C./minute, and the polyester has a hydroxyl value of 1 to 60 mgKOH/g.

In the thermally removable pressure-sensitive adhesive sheet of the invention, the foaming agent preferably includes thermally expandable microspheres.

In the thermally removable pressure-sensitive adhesive sheet of the invention, the polyester preferably contains 10 to 50% by mole of the lactic acid unit and 50 to 90% by mole of the other components than the lactic acid unit, and the molar ratio of the dibasic acid unit to the glycol unit is preferably 1:0.8 to 1:1.2.

In the thermally removable pressure-sensitive adhesive sheet of the invention, the dibasic acid unit preferably further includes an aliphatic dibasic acid other than the dimer acid.

In the thermally removable pressure-sensitive adhesive sheet of the invention, the polyester preferably includes a tri- or polyfunctional carboxylic acid and/or polyol component as a component other than the lactic acid unit, the dibasic acid unit, and the glycol unit, and the polyester preferably has a dispersity (Mw/Mn) of 2.5 to 10.0.

In the thermally removable pressure-sensitive adhesive sheet of the invention, the polyester preferably has an acid value of 5 mgKOH/g or less.

In the thermally removable pressure-sensitive adhesive sheet of the invention, the composition preferably contains 5 to 60 parts by weight of the foaming agent based on 100 parts by weight of the polyester.

In the thermally removable pressure-sensitive adhesive sheet of the invention, the crosslinking agent is preferably a polyvalent isocyanurate.

In the thermally removable pressure-sensitive adhesive sheet of the invention, the pressure-sensitive adhesive layer preferably has a gel fraction of 40 to 85% by weight.

The thermally removable pressure-sensitive adhesive sheet of the invention preferably has an initial adhesive strength of 2 N/20 mm or more with respect to a stainless steel plate, and preferably has an adhesive strength of 0.3 N/20 mm or less with respect to the stainless steel plate after foaming by heating.

In the thermally removable pressure-sensitive adhesive sheet of the invention, the substrate is preferably biodegradable.

Effects of the Invention

According to the invention, a polyester produced with plant-derived raw materials including lactic acid and a dibasic acid is used to form a pressure-sensitive adhesive sheet for thermally removable applications. Therefore, in contrast to pressure-sensitive adhesive sheets produced using fossil resource (petroleum)-derived raw materials, the thermally removable pressure-sensitive adhesive sheet according to the invention can suppress the depletion of fossil resources (petroleum) and can achieve carbon neutral status even when it is used and then removed and incinerated. According to the invention, thermally removable pressure-sensitive adhesive sheets that are global environmentally-friendly, have stable adherability before foaming by heating, and have good peelability after foaming by heating can be advantageously obtained.

EMBODIMENTS FOR CARRYING OUT THE INVENTION

The polyester for use in the thermally removable pressure-sensitive adhesive sheet of the invention contains at least a lactic acid unit, a dibasic acid unit, and a glycol unit. The method for synthesizing the polyester is not restricted, and it can be synthesized using a known polymerization method.

Examples of the lactic acid unit include, but are not limited to, L-lactide, D-lactide, DL-lactide, meso-lactide, L-lactic acid, D-lactic acid, and DL-lactic acid. Among them, DL-lactide is preferred in view of polymerization reaction efficiency and solubility in solvents. The polyester with the desired properties can be obtained by copolymerization with any of these lactic acid units. One of these lactic acid units may be used, or two or more of these lactic acid units may be used in combination.

The content of the lactic acid unit in the polyester components is preferably from 10 to 50% by mole, more preferably from 15 to 45% by mole. If it is less than 10% by mole, the pressure-sensitive adhesive layer produced using the polyester may have reduced elastic modulus, so that the adhesive properties of the pressure-sensitive adhesive may vary with time. If it is more than 50% by mole, the polyester may have a high glass transition temperature (Tg), which is not preferred because it may cause degradation of adhesive properties.

On the other hand, the content of the components other than the lactic acid unit in the polyester components is preferably from 50 to 90% by mole, more preferably from 55 to 85% by mole. If it is less than 50% by mole, the pressure-sensitive adhesive produced using the polyester may have low adhesive properties, and if it is more than 90% by mole, the pressure-sensitive adhesive produced using the polyester may have reduced cohesive strength, which is not preferred because the adhering strength (adhesive strength) to the adherend (such as a backing or substrate) may decrease.

The dibasic acid unit includes a dimer acid. A hydrogenated dimer acid may also be used to form the dimer acid unit. The polyester with good adhesive properties can be obtained by copolymerization with any of these dibasic acid units. One of these dibasic acid units may be used, or two or more of these dibasic acid units may be used in combination.

In the polyester, the dibasic acid unit preferably further includes an aliphatic dibasic acid other than the dimer acid. When an aliphatic dibasic acid other than the dimer acid is subjected to the copolymerization, it can increase the compatibility between the dimer acid and lactic acid, so that they are expected to have increased solubility in solvents.

The aliphatic dibasic acid is typically, but not limited to, a polycarboxylic acid, an alkyl ester thereof, or an acid anhydride thereof.

Examples of the polycarboxylic acid include aliphatic and alicyclic dicarboxylic acids such as adipic acid, azelaic acid, sebacic acid, 1,4-cyclohexanedicarboxylic acid, 4-methyl-1,2-cyclohexanedicarboxylic acid, dodecenyl succinic anhydride, fumaric acid, succinic acid, dodecanedicarboxylic acid, hexahydrophthalic anhydride, tetrahydrophthalic anhydride, maleic acid, maleic anhydride, itaconic acid, and citraconic acid. In particular, sebacic acid, which can be obtained from plants, is preferred. One of these acids may be used, or two or more these acids may be used in combination.

An aromatic dibasic acid may also be used to such an extent that it does not degrade the properties of the polyester for use in the thermally removable pressure-sensitive adhesive sheet of the invention. Examples of the aromatic dibasic acid include, but are not limited to, terephthalic acid, isophthalic acid, orthophthalic acid, 1,5-naphthalenedicarboxylic acid, 2,6-naphthalenedicarboxylic acid, 4,47-diphenyldicarboxylic acid, 2,2'-diphenyldicarboxylic acid, and 4,4'-diphenyletherdicarboxylic acid. One of these acids may be used, or two or more of these acids may be used in combination.

For example, the glycol unit to be used may be, but not limited to, an aliphatic glycol. The use of an aliphatic glycol makes it possible to increase the molecular weight of the polyester and to improve the adhesive properties and durability of the pressure-sensitive adhesive produced with the polyester.

Examples of the aliphatic glycol include ethylene glycol, 1,2-propylene glycol, 1,3-propanediol, 2-methyl-1,3-propanediol, 1,2-butanediol, 1,3-butanediol, 1,4-butanediol, 1,5-pentanediol, 1,6-hexanediol, 3-methyl-1,5-pentanediol, neopentyl glycol, diethylene glycol, dipropylene glycol, 2,2,4-trimethyl-1,5-pentanediol, 2-ethyl-2-butylpropanediol, 1,9-nonanediol, 2-methyloctanediol, 1,10-decanediol, 1,4-cyclohexanedimethanol, and 1,2-cyclohexanedimethanol. In particular, 1,3-propanediol, which can be obtained from plants, is preferred. One of these glycols may be used, or two or more of these glycols may be used in combination.

Any other glycol unit than the aliphatic glycol may be used in combination with the aliphatic glycol to such an extent that it does not degrade the properties of the polyester for use in the thermally removable pressure-sensitive adhesive sheet of the invention. Examples of such a glycol include an ethylene oxide adduct and a propylene oxide adduct of bisphenol A, an ethylene oxide adduct and a propylene oxide adduct of hydrogenated bisphenol A, polytetramethylene glycol, polypropylene glycol, polyethylene glycol, polycarbonate glycol, etc. One of these glycols may be used, or two or more of these glycols may be used in combination.

The molar ratio of the dibasic acid unit to the glycol unit is preferably 1:0.8 to 1:1.2, more preferably 1:0.9 to 1:1.1. If the molar ratio is less than 1:0.8 (the content of the glycol unit is lower), a higher acid value or a lower molecular weight may be obtained, and if it is higher than 1:1.2 (the content of the glycol unit is higher), a lower molecular weight may be obtained, or the adhesive properties may tend to decrease, which is not preferred.

Examples of the tri- or polyfunctional carboxylic acid include, but are not limited to, trimellitic acid, pyromellitic acid, benzophenonetetracarboxylic acid, biphenyltetracarboxylic acid, ethylene glycol bis(anhydrotrimellitate), and glycerol tris(anhydrotrimellitate).

Examples of the tri- or polyfunctional polyol include glycerin, trimethylolpropane, pentaerythritol, and polyglycerin.

In view of reactivity, the content of the tri- or polyfunctional carboxylic acid and/or polyol in the components of the polyester is preferably from 0.01 to 10% by mole, more preferably from 0.1 to 5% by mole.

As far as the properties of the polyester for use in the thermally removable pressure-sensitive adhesive sheet of the invention are not degraded, glycolic acid or a lactone may also be copolymerized (used), or glycolic acid or a lactone may be added and polymerized after the polymerization of other components to modify the end of the molecule. An acid anhydride may also be added and polymerized after the polymerization of other components to convert the end of the molecule to a carboxyl group. One of these may be used, or two or more of these may be used in combination.

The polyester preferably further contains the tri- or polyfunctional carboxylic acid and/or polyol component as a component other than the lactic acid unit, the dibasic acid unit, and the glycol unit, and the polyester preferably has a dispersity (Mw/Mn) of 2.5 to 10.0, more preferably 2.5 to 9.5. When the dispersity is in the above range, the adhesive strength can be effectively increased, and the pressure-sensitive adhesive can be effectively prevented from being transferred to the adherend. When the tri- or polyfunctional carboxylic acid and/or polyol is added, the molecular weight of the polyester for use in the invention can be further increased, so that the adhesive produced using the polyester can have good adhesive properties. In the description, Mw represents weight average molecular weight, and Mn represents number average molecular weight.

The polyester has a glass transition temperature (Tg) of −70 to −20° C., preferably −60 to −40° C. as measured using a differential scanning calorimeter at a temperature rise rate of 20° C./minute. If the Tg is lower than −70° C., the holding power may decrease, and if the Tg is higher than −20° C., the pressure-sensitive adhesive produced using the polyester may have degraded adhesive properties at room temperature, which is not preferred.

The polyester has a weight average molecular weight of 20,000 to 200,000, preferably 50,000 to 150,000. A weight average molecular weight of less than 20,000 may cause a reduction in the adhesive strength of the pressure-sensitive adhesive produced using the polyester. A weight average molecular weight of more than 200,000 is also not preferred, because it may cause a reduction in cohesive strength or in holding power.

The polyester has a hydroxyl value of 1 to 60 mgKOH/g, preferably 2 to 40 mgKOH/g, in particular, preferably 3 to 20 mgKOH/g. If the hydroxyl value is less than 1 mgKOH/g, the polyester will have low reactivity with a crosslinking agent, which will be a cause of a reduction in the cohesive strength of the pressure-sensitive adhesive produced using the polyester. A hydroxyl value of more than 60 mgKOH/g may cause a reduction in water resistance, and therefore is not preferred.

The polyester preferably has an acid value of 5 mgKOH/g or less, more preferably 0.1 to 3 mgKOH/g. An acid value of more than 5 mgKOH/g may cause acceleration of hydrolysis and a reduction in durability, and therefore is not preferred.

The polyester-based pressure-sensitive adhesive composition used for the thermally removable pressure-sensitive adhesive sheet of the invention is preferably a polyester composition containing 50 to 100 parts by weight of the polyester (polyester (i)) and 0 to 50 parts by weight of a branched polyester oligomer (ii) with a hydroxyl value of 100 to 1,000 mgKOH/g, more preferably a polyester composition containing 90 to 99 parts by weight of the polyester (i) and 1 to 10 parts by weight of a branched polyester oligomer (ii) with a hydroxyl value of 100 to 800 mgKOH/g. The addition of the branched polyester oligomer (ii) is effective in accelerating curing (crosslinking) and effective in reducing staining of the adherend after removal when it is used to form a pressure-sensitive adhesive (layer). If the hydroxyl value is less than 100 mgKOH/g, the curing-accelerating effect may be insufficient, and a hydroxyl value of more than 1,000 mgKOH/g may cause a reduction in solubility in general-purpose organic solvents, and therefore is not preferred. If the added amount of the branched polyester oligomer (ii) is less than 1 part by weight, the curing-accelerating effect may be insufficient, and an added amount of more than 50 parts by weight may cause degradation of the adhesive properties, and therefore is not preferred. As used herein, the term "polyester composition" is intended to include a polyester alone (the case where only the polyester is used with no branched polyester oligomer) or a mixture of the polyester and the branched polyester oligomer, and the term "polyester-based pressure-sensitive adhesive composition" is intended to include a mixture containing the polyester composition and an additive such as a crosslinking agent.

The branched polyester oligomer (ii) has a branched structure and good solubility in organic solvents, and is relatively cheap from an economic point of view.

The branched polyester oligomer (ii) preferably has a number average molecular weight of 1,000 to 8,000, more preferably 1,000 to 6,000. A number average molecular weight of less than 1,000 may be a cause of staining of the adherend, and a number average molecular weight of more than 8,000 may cause a reduction in reactivity with a crosslinking agent, and therefore is not preferred.

For example, the structure of the branched polyester oligomer (ii) is preferably, but not limited to, a structure having a main skeleton obtained by polycondensation or polyaddition reaction of ABx compound. As used herein, the term "ABx compound" means a compound having different functional groups A and B (organic groups). The ABx compound is also a compound having a functional group that does not cause intramolecular condensation or intramolecular addition reaction but can cause intermolecular condensation or intermolecular addition reaction. In particular, the main skeleton preferably has an ester bond. In the different functional groups, for example, the functional group A is a carboxyl group or a derivative thereof, and the functional group B is a hydroxyl group or a derivative thereof, and the ABx compound is a compound having these groups.

Examples of the ABx compound include 2,2-dimethylolpropionic acid, 2,2-dimethylolbutanoic acid, 5-(2-hydroxyethoxy)isophthalic acid, 5-acetoxyisophthalic acid, 3,5-bis(2-hydroxyethoxy)benzoic acid, 3,5-bis(2-hydroxyethoxy)benzoic acid methyl ester, 4,4-(4'-hydroxyphenyl)pentanoic acid, 5-hydroxycyclohexane-1,3-dicarboxylic acid, 1,3-dihydroxy-5-carboxycyclohexane, 5-(2-hydroxyethoxy)cyclohexane-1,3-dicarboxylic acid, and 1,3-(2-hydroxyethoxy)-5-carboxycyclohexane. In particular, 2,2-dimethylolpropionic acid or 2,2-dimethylolbutanoic acid is preferred in view of versatility of raw material compounds and ease of polymerization reaction process.

The branched polyester oligomer (ii) is also effective, because it has an ester bond and therefore has good compatibility with the polyester (i) so that the product (crosslinked product) of the reaction between them tends to have higher transparency. In particular, a branched polyester oligomer (ii) of an aliphatic monomer tends to have higher compatibility, and therefore is preferred.

The branched polyester oligomer (ii) can be produced by a method including allowing the ABx compound alone to react in the presence of a condensation reaction catalyst to synthesize the oligomer. In addition, a polyol group-containing compound, a polycarboxylic acid, or a compound having both a hydroxyl group and a carboxyl group may be used to form the branched point of the branched polyester oligomer (ii).

Examples of the polyol group-containing compound include various general-purpose glycol compounds and tri- or polyfunctional hydroxyl group-containing compounds such as trimethylolpropane, pentaerythritol, and dipentaerythritol.

Examples of the polycarboxylic acid include various general-purpose dibasic acids and tri- or polyfunctional carboxylic acid compounds such as trimellitic acid, pyromellitic acid, and benzophenonetetracarboxylic acid.

In addition, examples of the compound having both a hydroxyl group and a carboxyl group include glycolic acid, hydroxypivalic acid, 3-hydroxy-2-methylpropionic acid, lactic acid, glyceric acid, malic acid, and citric acid.

Besides the polyol group-containing compound, the polycarboxylic acid, or the compound having both a hydroxyl group and a carboxyl group, a straight-chain (linear) polyester oligomer obtained by condensation reaction of a dibasic acid with a glycol compound, or a specific functional group-containing branched polyester oligomer (iii) obtained by copolymerization of a dibasic acid, a glycol compound, and a tri- or polyfunctional polyol group-containing compound or a polycarboxylic acid may also be used to form the branched point of the branched polyester oligomer (ii).

Any of various general-purpose dibasic acids, a glycol compound, a tri- or polyfunctional polycarboxylic acid, and a polyhydric alcohol compound may be used as a raw material for the straight-chain (linear) polyester oligomer or the specific functional group-containing branched polyester oligomer (iii) capable of forming the branched point.

Examples of the dibasic acid include aliphatic dibasic acids such as succinic acid, adipic acid, azelaic acid, sebacic acid, and dodecanoic acid; aromatic dibasic acids such as terephthalic acid, isophthalic acid, orthophthalic acid, 1,2-naphthalenedicarboxylic acid, and 1,6-naphthalenedicarboxylic acid; and alicyclic dibasic acids such as 1,2-cyclohexanedicarboxylic acid, 1,4-cyclohexanedicarboxylic acid, and 4-methyl-1,2-cyclohexanedicarboxylic acid. Among them, particularly in view of heat resistance, terephthalic acid, isophthalic acid, orthophthalic acid, 1,2-naphthalenedicarboxylic acid, and 1,6-naphthalenedicarboxylic acid are preferred, and terephthalic acid, 1,2-naphthalenedicarboxylic acid, and 1,6-naphthalenedicarboxylic acid are particularly preferred.

Examples of the glycol compound include aliphatic dials such as ethylene glycol, 1,2-propylene glycol, 1,3-propylene glycol, 1,2-butylene glycol, 1,3-butylene glycol, 2,3-butylene glycol, 1,4-butylene glycol, 2-methyl-1,3-propylene glycol, neopentyl glycol, 3-methyl-1,5-pentadiol, 2,2,4-trimethyl-1,3-pentanediol, 2,4-diethyl-1,5-pentanediol, 2-ethyl-1,3-hexanediol, 2,2-dimethyl-3-hydroxypropyl-2',2'-dimethyl-3-hydroxypropanate, 2-n-butyl-2-ethyl-1,3-propanediol, 3-ethyl-1,5-pentanediol, 3-propyl-1,5-pentanediol, 2,2-diethyl-1,3-propanediol, and 3-octyl-1,5-pentanediol; alicyclic glycols such as 1,3-bis(hydroxymethyl)cyclohexane, 1,4-bis(hydroxymethyl)cyclohexane, 1,4-bis(hydroxyethyl)cyclohexane, 1,4-bis(hydroxypropyl)cyclohexane, 1,4-bis(hydroxymethoxy)cyclohexane, 1,4-bis(hydroxyethoxy)cyclohexane, 2,2-bis(4-hydroxymethoxycyclohexyl)propane, 2,2-bis(4-hydroxyethoxycyclohexyl)propane, bis(4-hydroxycyclohexyl)methane, 2,2-bis(4-hydroxycyclohexyl)propane, and 3(4),8(9)-tricyclo[5.2.1.$0^{2,6}$]decanedimethanol; and aromatic glycols such as ethylene oxide or propylene oxide adducts of bisphenol A or the like.

In addition, examples of the tri- or polyfunctional polycarboxylic acid and the polyol group-containing compound include trimellitic acid, pyromellitic acid, benzophenonetetracarboxylic acid, glycerin, trimethylolpropane, and pentaerythritol.

Examples of the method for removing water produced by the polymerization (condensation) reaction include a method of removing water by azeotrope with toluene or xylene, a method including blowing inert gas into the reaction system so that the produced water and monoalcohol can be discharged together with the inert gas to the outside of the reaction system, and a method of distillation under reduced pressure.

The polymerization catalyst used in the polymerization (condensation) reaction may be one commonly used in the production of polyesters, and examples of such a catalyst include, but are not limited to, various metal compounds such as titanium-based, tin-based, antimony-based, zinc-based, and germanium-based compounds; and strong acid compounds such as p-toluenesulfonic acid and sulfuric acid.

In order to increase the compatibility with the polyester, it is more preferred to introduce a long-chain hydrocarbon group of 6 or more carbon atoms into the end group of the branched polyester oligomer. For example, a hydrocarbon group of 6 or more carbon atoms may be introduced by a method of performing addition reaction or condensation reaction of a compound having a hydrocarbon group of 6 or more carbon atoms with the terminal carboxyl or hydroxyl group of the branched polyester oligomer prepared previously. Examples of such a compound include a monoalcohol having a long-chain alkyl group, such as hexanol, octanol, decyl alcohol, undecyl alcohol, or dodecyl alcohol; and a monocarboxylic acid having a long-chain alkyl or alkenyl group, such as octanoic acid, decanoic acid, dodecanoic acid, myristic acid, palmitic acid, stearic acid, or oleic acid having an unsaturated group, or a methyl ester derivative thereof.

There are also a method of performing ring-opening addition of a carboxylic anhydride compound having a hydrocarbon group of 6 or more carbon atoms to the terminal hydroxyl group in the presence of a basic catalyst; and a method of performing addition reaction of a compound having a glycidyl group and a hydrocarbon group of 6 or more carbon atoms with the terminal carboxyl group in the presence of an appropriate catalyst such as triphenylphosphine. The compound having a hydrocarbon group may be an acid anhydride compound, examples of which include dodecenylsuccinic anhydride and octadecylsuccinic anhydride. Examples of the compound having a glycidyl group include various aryl glycidyl ethers such as phenyl glycidyl ether; polyethylene glycol monoglycidyl ether, polypropylene glycol monoglycidyl ether, and polytetramethylene glycol monoglycidyl ether; and monoglycidyl ethers such as alkyl, alkenyl, and alkynyl glycidyl ethers.

In a preferred mode, the polyester-based pressure-sensitive adhesive composition is produced using a plant-derived raw material. This is because the plant-derived raw material, which is biodegradable and said to be so-called carbon neutral, can form a global environmentally-friendly or environmentally-sound, pressure-sensitive adhesive. The composition preferably has a biomass degree of 60% or more, more preferably 70% or more, which is a measure of how much plant-derived material the composition contains. As used herein, the term "biomass degree (%)" means the plant-derived material content, which is the calculated ratio of the weight of the plant-derived raw material(s) used to the total weight of the raw materials used to form the polyester-based pressure-sensitive adhesive composition. Examples of the plant-derived raw material include a dimer acid, sebacic acid or the like for the dibasic acid component, lactic acid for the lactic acid component, and 1,3-propylene glycol for the glycol (diol) component.

(Foaming Agent)

The polyester-based pressure-sensitive adhesive composition for use in the invention contains: a polyester including at least a lactic acid unit, a dibasic acid unit, and a glycol unit; a foaming agent; and a crosslinking agent. The foaming agent to be used preferably includes thermally expandable microspheres. Such thermally expandable microspheres may be appropriately selected from known thermally expandable microspheres. Thermally expandable microspheres having undergone microencapsulation are advantageously used, because of easy mixing operation and other advantages. For example, such thermally expandable microspheres may each include an elastic shell and a substance that is encapsulated in the shell and capable of being easily gasified and expanded by heating, such as isobutane, propane, or pentane. The shell is often made of a hot melt material or a material capable of being destroyed by thermal expansion.

Examples of the material that can form the shell include a vinylidene chloride-acrylonitrile copolymer, polyvinyl alcohol, polyvinyl butyral, polymethyl methacrylate, polyacrylonitrile, polyvinylidene chloride, and polysulfone. Thermally expandable microspheres can be produced by common methods such as coacervation methods and interfacial polymerization methods. For example, thermally expandable microspheres may be commercially available products such as "Matsumoto Microsphere" series manufactured by Matsumoto Yushi-Seiyaku Co., Ltd.

The adhesive (adhering) strength of the pressure-sensitive adhesive layer (thermally-expandable pressure-sensitive adhesive layer) should be efficiently and stably reduced by a heat treatment. Therefore preferred are thermally expandable microspheres that have suitable strength so as not to burst until the volume expansion ratio reaches 5 times or more, especially 7 times or more, particularly 10 times or more.

The average particle size of the thermally expandable microspheres may be appropriately selected depending on the thickness of the pressure-sensitive adhesive layer or the like. For example, the thermally expandable microspheres preferably has an average particle size of 100 μm or less, more preferably 80 μm or less, even more preferably 1 to 50 μm, in particular, preferably 1 to 30 μm. The average particle size of the thermally expandable microspheres may be controlled in the process of producing the thermally expandable microspheres or controlled by such a method as classification after they are produced.

In an embodiment of the invention, any other foaming agent than thermally expandable microspheres may be used in combination with or in place of the thermally expandable microspheres. Such a foaming agent may be appropriately selected and used from a variety of foaming agents such as various inorganic and organic foaming agents. Typical examples of inorganic foaming agents include ammonium carbonate, ammonium hydrogencarbonate, sodium hydrogencarbonate, ammonium nitrite, sodium borohydride, and various azides. Typical examples of organic foaming agents include water; alkane chlorofluorides such as trichloromonofluoromethane and dichloromonofluoromethane; azo compounds such as azobisisobutyronitrile, azodicarbonamide, and barium azodicarboxylate; hydrazine compounds such as p-toluenesulfonyl hydrazide, diphenylsulfone-3,3'-disulfonyl hydrazide, 4,4'-oxybis(benzene sulfonyl hydrazide), and allyl bis(sulfonyl hydrazide); semicarbazide compounds such as p-toluoylenesulfonyl semicarbazide and 4,4'-oxybis(benzene sulfonyl semicarbazide); triazole compounds such as 5-morpholyl-1,2,3,4-thiatriazole; and N-nitroso compounds such as N,N'-dinitrosopentamethylenetetramine and N,N'-dinitrosoterephthalamide.

The amount of the foaming agent to be added may be appropriately determined depending on how much the adhesive strength should be reduced. More specifically, the added amount of the foaming agent is preferably from 5 to 60 parts by weight, more preferably from 5 to 40 parts by weight, in particular, preferably from 5 to 10 parts by weight, based on 100 parts by weight of the polyester used to form the pressure-sensitive adhesive layer. An added amount of more than 60 parts by weight is not preferred, because with such an amount, peeling may occur not only at the interface between the adherend and the pressure-sensitive adhesive layer but also at the interface between the substrate (backing) and the pressure-sensitive adhesive layer during foaming by heating. An added amount of less than 5 parts by weight is also not preferred, because with such an amount, the adhesive strength may fail to decrease even after foaming by heating so that the adherend cannot be easily peeled off.

The polyester-based pressure-sensitive adhesive composition for use in the thermally removable pressure-sensitive adhesive sheet of the invention contains a crosslinking agent. A pressure-sensitive adhesive layer can be formed by subjecting the crosslinking agent-containing pressure-sensitive adhesive composition to a crosslinking reaction. The crosslinking agent to be used is not restricted and may be any conventionally known one such as a polyvalent isocyanurate, a polyfunctional isocyanate, a polyfunctional melamine compound, a polyfunctional epoxy compound, a polyfunctional oxazoline compound, a polyfunctional aziridine compound, or a metal chelate compound. In a preferred mode, a polyvalent isocyanurate or a polyfunctional isocyanate compound is used, particularly in view of the transparency of the resulting pressure-sensitive adhesive layer or the achievement of high gel fraction.

For example, the polyvalent isocyanurate may be a polyisocyanurate of hexamethylene diisocyanate. The use of such a compound makes it possible to achieve the object of obtaining a pressure-sensitive adhesive layer with transparency and high gel fraction, and therefore is advantageous. Commercially available products of the polyvalent isocyanurate may also be used, examples of which include DURANATE TPA-100 (trade name, manufactured by Asahi Kasei Chemicals Corporation) and CORONATE HK, CORONATE HX, and CORONATE 2096 (trade names, manufactured by Nippon Polyurethane Industry Co., Ltd.). One of these may be used, or two or more of these may be used in combination.

The polyfunctional isocyanate compound is preferably, but not limited to, a compound having at least two isocyanate groups, more preferably three or more isocyanate groups in the molecule (when the composition contains the branched polyester oligomer (ii), it may have two or more isocyanate groups), examples of which include aliphatic polyisocyanates, alicyclic polyisocyanates, and aromatic polyisocyanates. One of these may be used, or two or more of these may be used in combination.

Examples of the aliphatic polyisocyanates include 1,2-ethylene diisocyanate, tetramethylene diisocyanates such as 1,2-tetramethylene diisocyanate, 1,3-tetramethylene diisocyanate, and 1,4-tetramethylene diisocyanate; hexamethylene diisocyanates such as 1,2-hexamethylene diisocyanate, 1,3-hexamethylene diisocyanate, 1,4-hexamethylene diisocyanate, 1,5-hexamethylene diisocyanate, 1,6-hexamethylene diisocyanate, and 2,5-hexamethylene diisocyanate; and 2-methyl-1,5-pentane diisocyanate, 3-methyl-1,5-pentane diisocyanate, and lysine diisocyanate.

Examples of the alicyclic polyisocyanates include isophorone diisocyanate; cyclohexyl diisocyanates such as 1,2-cyclohexyl diisocyanate, 1,3-cyclohexyl diisocyanate, and 1,4-cyclohexyl diisocyanate; cyclopentyl diisocyanates such as 1,2-cyclopentyl diisocyanate and 1,3-cyclopentyl diisocyanate; hydrogenated xylylene diisocyanate, hydrogenated tolylene diisocyanate, hydrogenated diphenylmethane diisocyanate, hydrogenated tetramethylxylene diisocyanate, and 4,4'-dicyclohexylmethane diisocyanate.

Examples of the aromatic polyisocyanates include 2,4-tolylene diisocyanate, 2,6-tolylene diisocyanate, 4,4'-diphenylmethane diisocyanate, 2,4'-diphenylmethane diisocyanate, 2,2'-diphenylmethane diisocyanate, 4,4'-diphenylether diisocyanate, 2-nitrodiphenyl-4,4'-diisocyanate, 2,2'-diphenylpropane-4,4'-diisocyanate, 3,3'-dimethyldiphenylmethane-4,4'-diisocyanate, 4,4'-diphenylpropane diisocyanate, m-phenylene diisocyanate, p-phenylene diisocyanate, naphthylene-1,4-diisocyanate, naphthylene-1,5-diisocyanate, 3,3'-dimethoxydiphenyl-4,4'-diisocyanate, xylylene-1,4-diisocyanate, and xylylene-1,3-diisocyanate.

The polyfunctional isocyanate compound may also be a dimer or trimer of any of the aliphatic polyisocyanates, alicyclic polyisocyanates, aromatic polyisocyanates, and aromatic aliphatic polyisocyanates, and specifically, the polyfunctional isocyanate compound may be a dimer or trimer of diphenylmethane diisocyanate, a reaction product of trimethylolpropane and tolylene diisocyanate, a reaction product of trimethylolpropane and hexamethylene diisocyanate, or a polymer such as polymethylene polyphenylisocyanate, polyether polyisocyanate, or polyester polyisocyanate.

Commercially available products of the polyfunctional isocyanate compound may also be used, examples of which include CORONATE L (trade name, manufactured by Nippon Polyurethane Industry Co., Ltd.) as a trimer adduct of trimethylolpropane and tolylene diisocyanate, and CORONATE HL (trade name, manufactured by Nippon Polyurethane Industry Co., Ltd.) as a trimer adduct of trimethylolpropane and hexamethylene diisocyanate.

Examples of the polyfunctional melamine compound include methylated methylolmelamine and butylated hexamethylolmelamine, and examples of the polyfunctional epoxy compound include diglycidyl aniline and glycerin diglycidyl ether. One of these may be used, or two or more of these may be used in combination.

While the type or added amount of the crosslinking agent is not restricted, the crosslinking agent should be added so that a pressure-sensitive adhesive layer with a gel fraction of 40 to 85% by weight, preferably 50 to 75% by weight can be formed in a pressure-sensitive adhesive sheet for applications where peeling is performed through heating. If the gel fraction is less than 40% by weight, adhesive strength may be high so that peeling may be difficult after foaming by heating. A gel fraction of more than 85% by weight is not preferred, because at such a gel fraction, the initial adhesive strength may be low so that peeling may occur before heating.

For example, the added amount of the crosslinking agent is preferably from 0.001 to 20 parts by weight, more preferably from 0.001 to 10 parts by weight, based on 100 parts by weight of the polyester composition (which means the polyester when only the polyester is used with no branched polyester oligomer). If the added amount is less than 0.001 parts by weight, the process of forming the pressure-sensitive adhesive layer may fail to increase cohesive strength. An added amount of more than 20 parts by weight is not preferred, because with such an amount, the resulting pressure-sensitive adhesive layer may fail to have sufficient adhesive strength and may have reduced adhesive strength.

A catalyst may also be used as appropriate to efficiently control the gel fraction of the pressure-sensitive adhesive layer for use in the thermally removable pressure-sensitive adhesive sheet of the invention. Examples of the catalyst include tetra-n-butyl titanate, tetraisopropyl titanate, butyltin oxide, and dioctyltin dilaurate.

The added amount of the catalyst is preferably, but not limited to, 0.01 to 1 part by weight, more preferably 0.05 to 0.5 parts by weight, based on 100 parts by weight of the polyester composition (the polyester or a mixture of the polyester and the branched polyester oligomer). If the added amount is less than 0.01 parts by weight, the added catalyst may fail to be effective, and an added amount of more than 1 part by weight is not preferred, because such an amount may significantly reduce shelf life and reduce coating stability.

The polyester-based pressure-sensitive adhesive composition for forming the pressure-sensitive adhesive layer for use in the invention may also contain a combination of the crosslinking agent and a tackifying resin, which makes it possible to obtain a pressure-sensitive adhesive layer having the desired properties.

The tackifying resin is not restricted and may be any conventionally known one, examples of which include a terpene-based tackifying resin, a phenol-based tackifying resin, a rosin-based tackifying resin, an aliphatic petroleum resin, an aromatic petroleum resin, a copolymer-based petroleum resin, an alicyclic petroleum resin, a xylene resin, an epoxy-based tackifying resin, a polyamide-based tackifying resin, a ketone-based tackifying resin, and an elastomer-based tackifying resin. In particular, a rosin- or terpene-based tackifying resin produced from a plant-derived raw material is preferably used so that the biomass degree can be increased. One of these may be used, or two or more of these may be used in combination.

Examples of the terpene-based tackifying resin include a terpene resin, a terpene phenol resin, and an aromatic modified terpene resin, and specific examples that may be used include an α-pinene polymer, a β-pinene polymer, a dipentene polymer, and modifications thereof, such as a phenol-modified terpene-based resin, an aromatic modified terpene-based resin, a hydrogenated modified terpene-based resin, and a hydrocarbon-modified terpene-based resin.

Examples of the phenol-based tackifying resin that may be used include condensation products of formaldehyde and any of various phenols such as phenol, m-cresol, 3,5-xylenol, p-alkylphenol, and resorcin. Further examples that may be used include resols obtained by addition reaction of formaldehyde and any of the phenols in the presence of an alkali catalyst; novolac resins obtained by condensation reaction of formaldehyde and any of the phenols in the presence of an acid catalyst; and rosin-modified phenolic resins obtained by addition reaction of phenol with any of rosins such as unmodified or modified rosin and derivatives thereof and thermal polymerization of the addition product.

Examples of the rosin-based tackifying resin include a rosin resin, a polymerized rosin resin, a hydrogenated rosin resin, a rosin ester resin, a hydrogenated rosin ester resin, and a rosin phenol resin. Specific examples that may be used include unmodified rosin (raw rosin) such as gum rosin, wood rosin, or tall oil rosin, modified rosin obtained by hydrogenation, disproportionation, polymerization, or any other chemical modification thereof, and derivatives thereof.

The added amount of the tackifying resin is preferably from 10 to 100 parts by weight, more preferably from 15 to 80 parts by weight, in particular, preferably from 20 to 60 parts by weight, based on 100 parts by weight of the polyester composition (the polyester or a mixture of the polyester and the branched polyester oligomer). If the added amount is less than 10 parts by weight, the desired adhesive strength may fail to be obtained, and a pot-life effect may also fail to be produced. An added amount of more than 100 parts by weight is not preferred, because with such an amount, the crosslinking effect based on the addition of the crosslinking agent may be insufficient, and the compatibility with the polymer component (the polyester composition) may also be degraded, so that a problem such as a reduction in adhesive strength may occur.

As far as the properties of the pressure-sensitive adhesive layer (pressure-sensitive adhesive) for use in the thermally removable pressure-sensitive adhesive sheet of the invention are not degraded, any of common additives may also be used, such as ultraviolet absorbers, photostabilizers, peeling regulators, plasticizers, softening agents, fillers, colorants such as pigments and dyes, antioxidants, and surfactants.

The pressure-sensitive adhesive layer is made from the polyester-based pressure-sensitive adhesive composition. The use of the polyester-based pressure-sensitive adhesive composition makes it possible to obtain a global environmentally-friendly pressure-sensitive adhesive layer with good adhesive properties.

The pressure-sensitive adhesive layer preferably has a storage modulus of $1 \times 10^4$ to $1 \times 10^7$ Pa, more preferably $1 \times 10^5$ to $1 \times 10^6$ Pa, as measured using a dynamic viscoelasticity meter under the conditions of 23° C. and a frequency of 1 Hz. A storage modulus of less than $1 \times 10^4$ Pa may cause the problem of a reduction in the cohesive strength and holding power of the pressure-sensitive adhesive layer. On the other hand, a storage modulus of more than $1 \times 10^7$ Pa is not preferred, because such a storage modulus may cause the problem of hardening of the pressure-sensitive adhesive layer and a reduction in pressure-sensitive adhesive strength.

For example, the thickness of the pressure-sensitive adhesive layer, which may be arbitrarily selected, is preferably from about 5 to about 1,000 µm, more preferably from about 20 to about 500 µm, in particular, preferably from about 30 to about 200 µm. If the thickness of the pressure-sensitive adhesive layer is less than 5 µm, sufficient adhesive strength may be difficult to obtain, so that peeling may easily occur. A thickness of more than 1,000 µm is not preferred, because with such a thickness, the adhesive strength may increase with time, which may make peeling difficult. The pressure-sensitive adhesive layer may be in the form of any of a single layer and a laminate.

The thermally removable pressure-sensitive adhesive sheet of the invention is obtained by forming the pressure-sensitive adhesive layer on at least one side of a substrate. As far as the characteristics of the thermally removable pressure-sensitive adhesive sheet of the invention are not degraded, an intermediate layer or an undercoat layer may also be provided.

Examples of the substrate (backing) that may be used include appropriate thin materials such as a paper-based backing such as a paper sheet; a fiber-based backing such as a fabric, a nonwoven fabric, a felt, or a net; a metal-based backing such as a metal foil or a metal sheet; a plastic-based backing such as a plastic film or sheet; a rubber-based backing such as a rubber sheet; a foamed product such as a foamed sheet; and laminates thereof (specifically including a laminate of a plastic-based backing and any other backing and a laminate of plastic films (or sheets)). In view of handleability and the like after heating, the backing preferably has high heat resistance so as not to melt at the temperature of heat treatment of the thermally-expandable pressure-sensitive adhesive layer. A plastic-based backing such as a plastic film or sheet is advantageously used as the backing. Examples of the material for such a plastic backing include an olefin-based resin including an α-olefin monomer component, such as polyethylene (PE), polypropylene (PP), an ethylene-propylene copolymer, or an ethylene-vinyl acetate copolymer (EVA); polyester such as polyethylene terephthalate (PET), polyethylene naphthalate (PEN), or polybutylene terephthalate (PBT); polyvinyl chloride (PVC); polyphenylene sulfide (PPS); an amide-based resin such as polyamide (nylon) or fully aromatic polyamide (aramid); and polyether ether ketone (PEEK). These materials may be used alone or in combination of two or more. In a particularly preferred mode, polylactic acid is used, which is global-environmentally-friendly, plant-derived material.

When a plastic-based material is used as the substrate (backing), its deformability such as elongation may be controlled by stretching or other processes. When a radiation-curable material is used as a foaming agent, a substrate that does not block radiation from passing therethrough is used in a preferred mode.

The surface of the substrate (backing) may have undergone a common surface treatment for enhancing adhesion to the pressure-sensitive adhesive layer (a thermally-expandable pressure-sensitive adhesive layer or any available non-thermally-expandable pressure-sensitive adhesive layer for use in the invention, which may further contain a surfactant), such as a chromic acid treatment, exposure to ozone, exposure to a flame, exposure to a high-voltage electric shock, an ionizing radiation treatment, or any other chemical or physical oxidation treatment, or a coating treatment with an undercoating agent. A coating treatment with a release agent such as silicone resin or fluororesin may also be performed to impart peelability from the thermally-expandable pressure-sensitive adhesive layer or the like.

If necessary, the substrate may contain any of various additives commonly used in backings (substrates) for pressure-sensitive adhesive tapes, such as ultraviolet absorbers, photostabilizers, antioxidants, fillers, pigments, and dyes.

If necessary, the substrate may also be appropriately subjected to a release treatment with any of release agents such as silicone-based, fluorine-based, long chain alkyl-based, and fatty acid amide-based release agents or a silica powder; any of adhesion facilitating treatments such as an antifouling treatment, an acid treatment, an alkali treatment, a primer treatment, a corona discharge treatment, a plasma treatment, and an ultraviolet treatment; or any of antistatic treatments such as coating-type, kneading-type, and vapor deposition-type antistatic treatments.

The thickness of the substrate (backing) may be arbitrarily selected depending on the material or shape of the substrate. For example, it is preferably from about 1 to about 1,000 µm, more preferably from about 1 to about 500 µm, even more preferably from 3 to 300 µm, in particular, preferably from 5 to 250 µm. A thickness out of the range may reduce workability or processability and therefore is not preferred.

The method of forming the pressure-sensitive adhesive layer may be based on a known pressure-sensitive adhesive sheet-manufacturing method, examples of which include, but are not limited to, a method including applying a pressure-sensitive adhesive composition (a solution of a pressure-sensitive adhesive composition in a solvent or a hot melt of a pressure-sensitive adhesive composition) to the substrate (backing) and drying the coating to form a pressure-sensitive adhesive layer, a method of transferring a pressure-sensitive adhesive layer formed on a release liner, a method of extruding and applying a pressure-sensitive adhesive layer-forming material onto the substrate, a method of extruding the substrate and a pressure-sensitive adhesive layer in two or more layers, and a method of laminating the substrate with a single pressure-sensitive adhesive layer. A co-extruding method or the like may also be used, in which a thermoplastic resin substrate and a pressure-sensitive adhesive layer are extruded in two or more layers by inflation molding or T-die molding. In the invention, the pressure-sensitive adhesive sheet may also include a pressure-sensitive adhesive film, a pressure-sensitive adhesive tape, or the like.

The pressure-sensitive adhesive composition (solution) may be applied using a conventionally known method such as roll coating, gravure coating, reverse roll coating, roll brush coating, air knife coating, spray coating, or extrusion coating with a die coater or the like.

The release liner is not restricted, and any conventionally-known release liner may be used as appropriate. For example, a product obtained by forming a release coating layer on at least one side of a release liner backing may be used. The release liner backing may be used in the form of a single layer or a plurality of layers.

Any of various thin materials such as plastic films, paper sheets, foamed products, and metal foils may be used as the release liner backing. A plastic film is particularly preferred. Examples of the material for the plastic film include polyester such as polyethylene terephthalate, polyolefin such as polypropylene or ethylene-propylene copolymer, and thermoplastic resin such as polyvinyl chloride.

The thickness of the release liner backing may be selected as appropriate, depending on the purpose.

The release coating layer is not restricted, and any conventionally-known release coating layer may be used. For example, a coating layer including an appropriate release agent such as a silicone, long-chain alkyl, or fluoride release agent may also be provided.

(Initial Adhesive Strength)

The thermally removable pressure-sensitive adhesive sheet of the invention preferably has an initial adhesive strength of 2 N/20 mm or more, more preferably 5 N/20 mm or more, at 23° C. and a peel angle of 180° with respect to a stainless steel plate. An initial adhesive strength of less than 2 N/20 mm is not preferred, because such an adhesive strength is not sufficient to the adherend, so that a trouble such as peeling may occur during use.

(Adhesive Strength after Foaming by Heating)

After foaming by heating, the thermally removable pressure-sensitive adhesive sheet of the invention preferably has an adhesive strength of 0.3 N/20 mm or less, more preferably 0.1 N/20 mm or less, at a peel angle of 180° with respect to the stainless steel plate. An adhesive strength of more than 0.3 N/20 mm after foaming by heating is not preferred, because such an adhesive strength is too high so that after the thermally removable pressure-sensitive adhesive sheet is used, an adhesive deposit may be formed on the adherend in the process of peeling off the sheet, or the sheet may be prevented from being peeled off from the adherend.

The thermally removable pressure-sensitive adhesive sheet of the invention can be widely used for conventionally well-known thermally removable applications, and since its load on the global environment is relatively small even when it is disposed after use, it is particularly preferably used in thermally removable pressure-sensitive adhesive sheet applications where the sheet is peeled off and incinerated after use.

EXAMPLES

Hereinafter, the invention is described in more detail with reference to the Examples, which are not intended to limit the invention. In the examples, the term "parts" means "parts by weight." The formulations and the results of evaluation are shown in Tables 1 and 2. In Table 1, the content of each monomer component used in the polyester synthesis is shown in units of % by mole, and in Tables 2, each added amount is shown in parts by weight.

(Preparation of Polyester A)

To a reaction can equipped with a stirrer, a thermometer, and a drain condenser were added 86 parts of dimer acid, 10 parts of sebacic acid, 30 parts of 1,3-propylene glycol, 0.4 parts of trimethylolpropane, 50 parts of DL-lactide, and 0.014 parts of tetrabutyl titanate and 0.014 parts of tin octylate as polymerization catalysts. After the temperature was raised to 250° C. over 5 hours in a nitrogen atmosphere at normal pressure, the mixture was allowed to react for 1 hour, in which esterification was performed while distilled water was removed out of the system. The pressure was further reduced to 10 mmHg over 30 minutes, and early-stage polymerization was performed at 250° C. for 30 minutes. The pressure was further reduced to 1 mmHg over 30 minutes, and late-stage polymerization was performed at 250° C., so that a polyester A was obtained. The formulations and the results of evaluation are shown in Tables 1.

<Preparation of Polyester B>

To a reaction can equipped with a stirrer, a thermometer, and a drain condenser were added 22 parts of L-lactide, 15 parts of DL-lactide, 54 parts of ε-caprolactone, 0.2 parts of ethylene glycol, and 0.026 parts of tin octylate as a polymerization catalyst. After the temperature was raised to 180° C. over 1 hour in a nitrogen atmosphere at normal pressure, the mixture was allowed to react for 3 hours, in which esterification was performed while distilled water was removed out of the system. The pressure was further reduced to 1 mmHg over 10 minutes. The pressure was reduced at 180° C. over 30 minutes, so that the lactide residue was removed, and a polyester B was obtained. The formulation and the results of the evaluation are shown in Table 1.

Example 1

After 100 parts of the polyester A was dissolved in a mixed solvent of 75 parts of methyl ethyl ketone (MEK) and 75 parts of ethyl acetate, 1.5 parts of a polyvalent isocyanurate (TPA-100, manufactured by Asahi Kasei Chemicals Corporation) as a crosslinking agent and 10 parts of a foaming agent (sphere MATSUMOTO MICROSPHERE F-80SD (thermally expandable micro spheres), manufactured by Matsumoto Yushi-Seiyaku Co., Ltd.) were added to the solution. The resulting mixture was applied onto a 25 μm thick polyethylene terephthalate film (LUMIRROR 25S-10, manufactured by TORAY INDUSTRIES, INC.) as a substrate so that a 40 μm thick coating could be formed after drying. The coating was dried at 100° C. for 3 minutes and then bonded to the release-treated surface of a release-treated polyethylene terephthalate film. The resulting laminate was further allowed to stand (aged) at 50° C. for 5 days, so that a thermally removable pressure-sensitive adhesive sheet was obtained.

Example 2

A thermally removable pressure-sensitive adhesive sheet was obtained by the same process as in Example 1, except that 8 parts of a polyvalent isocyanurate (TPA-100, manufactured by Asahi Kasei Chemicals Corporation) as a crosslinking agent was added instead.

Example 3

A pressure-sensitive adhesive sheet was obtained by the same process as in Example 1, except that 4 parts of a polyvalent isocyanurate (TPA-100, manufactured by Asahi Kasei Chemicals Corporation) as a crosslinking agent was added instead and that 0.1 parts of dioctyltin dilaurate (EMBILIZER OL-1, manufactured by Tokyo Fine Chemical CO., LTD.) was added as a catalyst.

Example 4

A pressure-sensitive adhesive sheet was obtained by the same process as in Example 2, except that 5 parts of a foaming agent (MATSUMOTO MICROSPHERE F-80SD (thermally expandable microspheres), manufactured by Matsumoto Yushi-Seiyaku Co., Ltd.) was added instead.

Example 5

A pressure-sensitive adhesive sheet was obtained by the same process as in Example 2, except that 55 parts of a foaming agent (Matsumoto Microsphere F-80SD (thermally expandable microspheres), manufactured by Matsumoto Yushi-Seiyaku Co., Ltd.) was added instead.

Example 6

A pressure-sensitive adhesive sheet was obtained by the same process as in Example 2, except that after a polyester composition composed of 100 parts of the polyester A and 8 parts of a branched polyester oligomer (Hyperbranched Polymer BOLTORN H40, 490 mgKOH/g in hydroxyl value, 5,100 in weight average molecular weight) was dissolved in a mixed solvent of 75 parts of methyl ethyl ketone (MEK) and 75 parts of ethyl acetate, 6 parts of a polyvalent isocyanurate (TPA-100, manufactured by Asahi Kasei Chemicals Corporation) as a crosslinking agent and 10 parts of a foaming agent (MATSUMOTO MICROSPHERE F-80SD (thermally expandable microspheres), manufactured by Matsumoto Yushi-Seiyaku Co., Ltd.) were added to the solution.

Comparative Example 1

A pressure-sensitive adhesive sheet was obtained by the same process as in Example 2, except that 1 part of a polyvalent isocyanurate (TPA-100, manufactured by Asahi Kasei Chemicals Corporation) as a crosslinking agent was added instead.

Comparative Example 2

A pressure-sensitive adhesive sheet was obtained by the same process as in Example 3, except that 8 parts of a polyvalent isocyanurate (TPA-100, manufactured by Asahi Kasei Chemicals Corporation) as a crosslinking agent was added instead.

Comparative Example 3

A pressure-sensitive adhesive sheet was obtained by the same process as in Example 2, except that 3 parts of a foaming agent (MATSUMOTO MICROSPHERE F-80SD (thermally expandable microspheres), manufactured by Matsumoto Yushi-Seiyaku Co., Ltd.) was added instead.

Comparative Example 4

A pressure-sensitive adhesive sheet was obtained by the same process as in Example 2, except that 70 parts of a foaming agent (MATSUMOTO MICROSPHERE F-80SD (thermally expandable microspheres), manufactured by Matsumoto Yushi-Seiyaku Co., Ltd.) was added instead.

Comparative Example 5

A pressure-sensitive adhesive sheet was obtained by the same process as in Example 3, except that 100 parts of the polyester B was added in place of the polyester A and that 2 parts of a polyvalent isocyanurate (TPA-100, manufactured by Asahi Kasei Chemicals Corporation) as a crosslinking agent was added instead.

The composition of each polyester and the results of the evaluation are shown in Table 1, and the composition of each pressure-sensitive adhesive sheet produced using the polyester and the results of the evaluation are shown in Table 2.

(Composition of Polyester)

The polyester was dissolved in chloroform-D, and the composition of the polyester was analyzed by subjecting the solution to $^1$H-NMR analysis using a nuclear magnetic resonance (NMR) analyzer 400-MR manufactured by Varian, Inc.

(Molecular Weight)

The number average molecular weight (Mn) and the weight average molecular weight (Mw) were determined as described below. About 0.2 g of the polyester or a mixture of the polyester and the branched polyester oligomer was placed in a petri dish and dried at 120° C. for 2 hours so that the solvent was removed by drying. Subsequently, 0.01 g of the polyester layer (or the layer of a mixture of the polyester and the branched polyester oligomer) on the petri dish was weighed, then added to 10 g of tetrahydrofuran (THF), and allowed to stand for 24 hours so that it was dissolved. The solution was subjected to gel permeation chromatography (GPC) method, and each molecular weight was determined from the calibration curve obtained using polystyrene standards.

(Measurement Conditions)

Analyzer: HLC-8220GPC, manufactured by TOSOH CORPORATION
Sample concentration: 0.1% by weight (THF solution)
Sample injection volume: 20 μl
Eluent: THF
Flow rate: 0.300 ml/minute
Measurement (column) temperature: 40° C.
Columns: sample column, TSKguardcolumn SuperHZ-L (single)+TSKgel SuperHZM-M (double); reference column, TSKgel SuperH-RC (single), each manufactured by TOSOH CORPORATION
Detector: differential refractometer (RI)

(Glass Transition Temperature of Polyester)

The glass transition temperature (Tg (° C.)) was determined using a differential scanning calorimeter (DSC-220 (product name), manufactured by Seiko Instruments Inc.) under the following measurement conditions: 5 mg of a measurement sample placed in an aluminum pan; temperature, −120 to 150° C.; temperature rise rate, 20° C./minute.

(Hydroxyl Value of Polyester and Polyester Composition)

About 0.5 g of a sample of the polyester or the polyester composition was placed in a 250 ml Erlenmeyer flask and weighed. Subsequently, 20.00 ml of a solution prepared by mixing acetic anhydride and anhydrous pyridine in a ratio of 1:10 (weight ratio) was taken and added to the Erlenmeyer flask, and a condenser was attached thereto. The mixture was refluxed under stirring for 20 minutes and then cooled to room temperature. Subsequently, 20 ml of acetone and 20 ml of distilled water were added to the Erlenmeyer flask through the condenser. After a phenolphthalein indicator was added thereto, the mixture was titrated with an aqueous 1.00 N (normal) sodium hydroxide solution. The hydroxyl value (mgKOH/g) was calculated by subtracting the result of additional measurement of a blank (containing no sample) from the result of the titration.

(Acid Value of Polyester and Polyester Composition)

In 20 ml of chloroform was dissolved 0.2 g of a sample of the polyester or the polyester composition. Using phenolphthalein as an indicator, the solution was titrated with a 0.1 N (normal) potassium hydroxide-ethanol solution, and the acid value (mgKOH/g) was calculated.

(Biomass Degree)

The percentage of the weight of the plant-derived raw materials used to the weight of all raw materials used was calculated and used as the biomass degree (%) in the evaluation.

Biomass degree (%)=100×(the weight of the plant-derived raw materials used)/(the weight of all raw materials used)

(Gel Fraction)

The pressure-sensitive adhesive sheet (with a 50 μm thick pressure-sensitive adhesive layer) obtained in each of the examples and the comparative examples was cut into a 5 cm×5 cm square piece. The cut piece sample was wrapped in a TEFLON (registered trademark) sheet whose weight was known, and the total weight was measured. The wrapped sample was allowed to stand in toluene at 23° C. for 7 days, so that the sol fraction was extracted from the sample. Subsequently, the sample was dried at 120° C. for 2 hours, and the dried weight was measured. The gel fraction was calculated from the following formula:

gel fraction (%)={(the weight after drying−the weight of the Teflon sheet)/(the weight before drying−the weight of the Teflon sheet)}×100

(Storage Modulus)

The pressure-sensitive adhesive layer was formed on a release liner (MRF38, manufactured by Mitsubishi Polyester Film Corporation, 38 μm in thickness), and the pressure-sensitive adhesive layer was shaped into a 3 mm thick, 8 mmφ diameter, test sample. Subsequently, the test sample was sandwiched between parallel plates with a diameter of 7.9 mm (for shearing test), and the storage modulus (G' (Pa)) of the sample was measured at 23° C. using a viscoelasticity tester ARES manufactured by Rheometric Scientific Inc., while shearing strain was applied thereto at a frequency of 1 Hz.

(Initial Adhesive Strength)

The pressure-sensitive adhesive layer was prepared with a thickness of 40 μm and bonded onto a polyethylene terephthalate film (LUMIRROR 25S-10, manufactured by TORAY INDUSTRIES, INC., 25 μm in thickness) as a substrate, so that a test sample of 100 mm long×20 mm wide was prepared. Subsequently, the test sample was bonded (press-bonded) onto a stainless steel plate (BA304, manufactured by Nikkal Shoko K.K., 0.5 mm in thickness) by one reciprocation of a roller under a pressure of 2 kg, and measured for adhesive strength (N/20 mm) at a peel angle of 180° and a rate of pulling of 300 mm/minute according to JIS C 2107.

(Adhesive Strength after Foaming by Heating)

A test sample was prepared as in the case of the initial adhesive strength test. After the test sample was heated for 1 minute on a hot plate set at 160° C., the adhesive strength after the heat storage was measured by the same method as in the case of the initial adhesive strength test.

(Heat Peelability)

The thermally removable pressure-sensitive adhesive sheet was cut into a measurement sample of a size of 10 mm wide×40 mm long. An ultrasonically cleaned stainless steel plate (BA304) was used as an adherend. After the separator was peeled off from the measurement sample, the thermally-expandable pressure-sensitive adhesive layer was bonded onto the stainless steel plate by one reciprocation of a roller under a pressure of 2 kg in an atmosphere at 23±2° C. and 50±5% RH, and then stored under an atmosphere at 50° C. in a drying machine for 1 day. After the storage, the sample was taken out of the drying machine and cooled at room temperature, and then heat-treated at 160° C. for 10 minutes (heat-treated using a hot air drier). It was visually observed whether the stainless steel plate was peeling from the thermally removable pressure-sensitive adhesive sheet. The case where the stainless steel plate was peeling from the thermally removable pressure-sensitive adhesive sheet was expressed by the mark "○," and the case where the stainless steel plate was not peeling form the sheet was expressed by the mark "x" in the evaluation of the heat peelability of the thermally removable pressure-sensitive adhesive sheet. The case where peeling (separation) already occurred before the heat treatment was expressed by the mark "xx."

TABLE 1

| Composition (mol % ratio) of polyester and results of evaluation of polyester | | Polyester | |
|---|---|---|---|
| | | A | B |
| Dibasic acid component | Dimer acid | 30 | |
| | Sebacic acid | 10 | |
| Glycol component | 1,3-propylene glycol | 39 | |
| | Ethylene glycol | | 0.2 |
| | Trimethylolpropane | 1 | |
| Lactic acid | DL-lactide | 20 | 51 |
| Copolymerized component | ε-caprolactone | | 49 |
| Tg | (° C.) | −54 | −39 |
| Hydroxyl vale | mgKOH/g | 6 | 0.6 |
| Acid value | mgKOH/g | 0.6 | 1.1 |
| Weight average molecular weight (Mw) | | 153,000 | 83,000 |
| Number average molecular weight (Mn) | | 29,000 | 49,000 |
| Dispersity (Mw/Mn) | | 5.3 | 1.7 |

TABLE 2

| Polyester-based pressure-sensitive adhesive composition (parts by weight) and results of evaluation thereof | | Example | | | | | | Comparative Example | | | | |
|---|---|---|---|---|---|---|---|---|---|---|---|---|
| | | 1 | 2 | 3 | 4 | 5 | 6 | 1 | 2 | 3 | 4 | 5 |
| Polyester | A | 100 | 100 | 100 | 100 | 100 | 100 | 100 | 100 | 100 | 100 | |
| | B | | | | | | | | | | | 100 |
| Branched polyester oligomer | H40 | | | | | | | | 8 | | | |

TABLE 2-continued

| Polyester-based pressure-sensitive adhesive composition (parts by weight) and results of evaluation thereof | | Example | | | | | | Comparative Example | | | | |
|---|---|---|---|---|---|---|---|---|---|---|---|---|
| | | 1 | 2 | 3 | 4 | 5 | 6 | 1 | 2 | 3 | 4 | 5 |
| Crosslinking agent | TPA-100 | 1.5 | 8 | 4 | 8 | 8 | 6 | 1 | 8 | 8 | 8 | 2 |
| Catalyst | OL-1 | | | 0.1 | | | | | 0.1 | | | 0.1 |
| Foaming agent | F-80SD | 10 | 10 | 10 | 5 | 55 | 10 | 10 | 10 | 3 | 70 | 10 |
| Gel fraction | wt % | 46 | 69 | 83 | 69 | 69 | 64 | 34 | 86 | 69 | 69 | 68 |
| Initial adhesive strength | N/20 mm | 11 | 7 | 2.5 | 8 | 3 | 4 | 15 | 1 | 8 | 1 | 1 |
| Adhesive strength after foaming by heating | N/20 mm | 0.3 | 0.1 | 0.1 | 0.2 | 0.1 | 0.1 | 1 | 0.1 | 1 | 0 | 0 |
| Storage modulus (23° C.) | ×10⁵ Pa | 2.3 | 2.3 | 2.3 | 2.2 | 3.0 | 4.0 | 2.3 | 2.3 | 2.3 | 3.5 | 8.3 |
| Biomass degree | wt % | 89 | 84 | 87 | 88 | 61 | 80 | 89 | 84 | 89 | 56 | 89 |
| Heat peelability | — | ○ | ○ | ○ | ○ | ○ | ○ | X | XX | X | XX | XX |

From the evaluation results in Table 2, it was demonstrated that in all of Examples 1 to 6, the initial adhesive strength was in the desired value range, the adhesive strength after foaming by heating was reduced to a very low level, the peeling process was easy to perform, and good heat-peelability (workability) was obtained. High biomass degrees of at least 61% by weight were also shown, and global environmentally-friendly, thermally removable pressure-sensitive adhesive sheets were successfully obtained.

In contrast, it was demonstrated that in Comparative Examples 1 and 3, the adhesive strength was high after foaming by heating, so that the heat peelability (workability) was low, and it was also demonstrated that in Comparative Examples 2, 4, and 5, the initial adhesive strength was low, and peeling already occurred before foaming by heating, so that heat peelability was poor or it was not possible to evaluate the heat peelability itself. Particularly in Comparative Example 5 where the dimer acid itself was not used, the result was inferior to each example. It was also demonstrated that Comparative Example 4 had a low biomass degree and therefore was not global environmentally-friendly.

The invention claimed is:

1. A thermally removable pressure-sensitive adhesive sheet, comprising:
    a substrate; and
    a pressure-sensitive adhesive layer that is provided on at least one side of the substrate and made from a polyester-based pressure-sensitive adhesive composition comprising a polyester comprising at least a lactic acid unit, a dibasic acid unit, and a glycol unit, a foaming agent in an amount of from 5 to 60 parts by weight relative to 100 parts by weight of the polyester, and a crosslinking agent, wherein
    the dibasic acid unit comprises a dimer acid,
    the polyester has a weight average molecular weight of 20,000 to 200,000 and a glass transition temperature of −70 to −20° C. as measured using a differential scanning calorimeter at a temperature rise rate of 20° C./minute,
    the polyester has a hydroxyl value of 1 to 60 mgKOH/g, and
    the pressure-sensitive adhesive layer has a gel fraction of 40 to 85% by weight.

2. The thermally removable pressure-sensitive adhesive sheet according to claim 1, wherein the foaming agent comprises thermally expandable microspheres.

3. The thermally removable pressure-sensitive adhesive sheet according to claim 1, wherein the polyester contains 10 to 50% by mole of the lactic acid unit and 50 to 90% by mole of components other than the lactic acid unit, and the molar ratio of the dibasic acid unit to the glycol unit is 1:0.8 to 1:1.2.

4. The thermally removable pressure-sensitive adhesive sheet according to claim 1, wherein the dibasic acid unit further comprises an aliphatic dibasic acid other than the dimer acid.

5. The thermally removable pressure-sensitive adhesive sheet according to claim 1, wherein the polyester comprises a tri- or polyfunctional carboxylic acid and/or polyol component as a component other than the lactic acid unit, the dibasic acid unit, and the glycol unit, and the polyester has a dispersity (Mw/Mn) of 2.5 to 10.0.

6. The thermally removable pressure-sensitive adhesive sheet according to claim 1, wherein the polyester has an acid value of 5 mgKOH/g or less.

7. The thermally removable pressure-sensitive adhesive sheet according to claim 1, wherein the crosslinking agent is a polyvalent isocyanurate.

8. The thermally removable pressure-sensitive adhesive sheet according to claim 1, which has an initial adhesive strength of 2 N/20 mm or more with respect to a stainless steel plate, and has an adhesive strength of 0.3 N/20 mm or less with respect to the stainless steel plate after foaming by heating.

9. The thermally removable pressure-sensitive adhesive sheet according to claim 1, wherein the substrate is biodegradable.

* * * * *